UNITED STATES PATENT OFFICE.

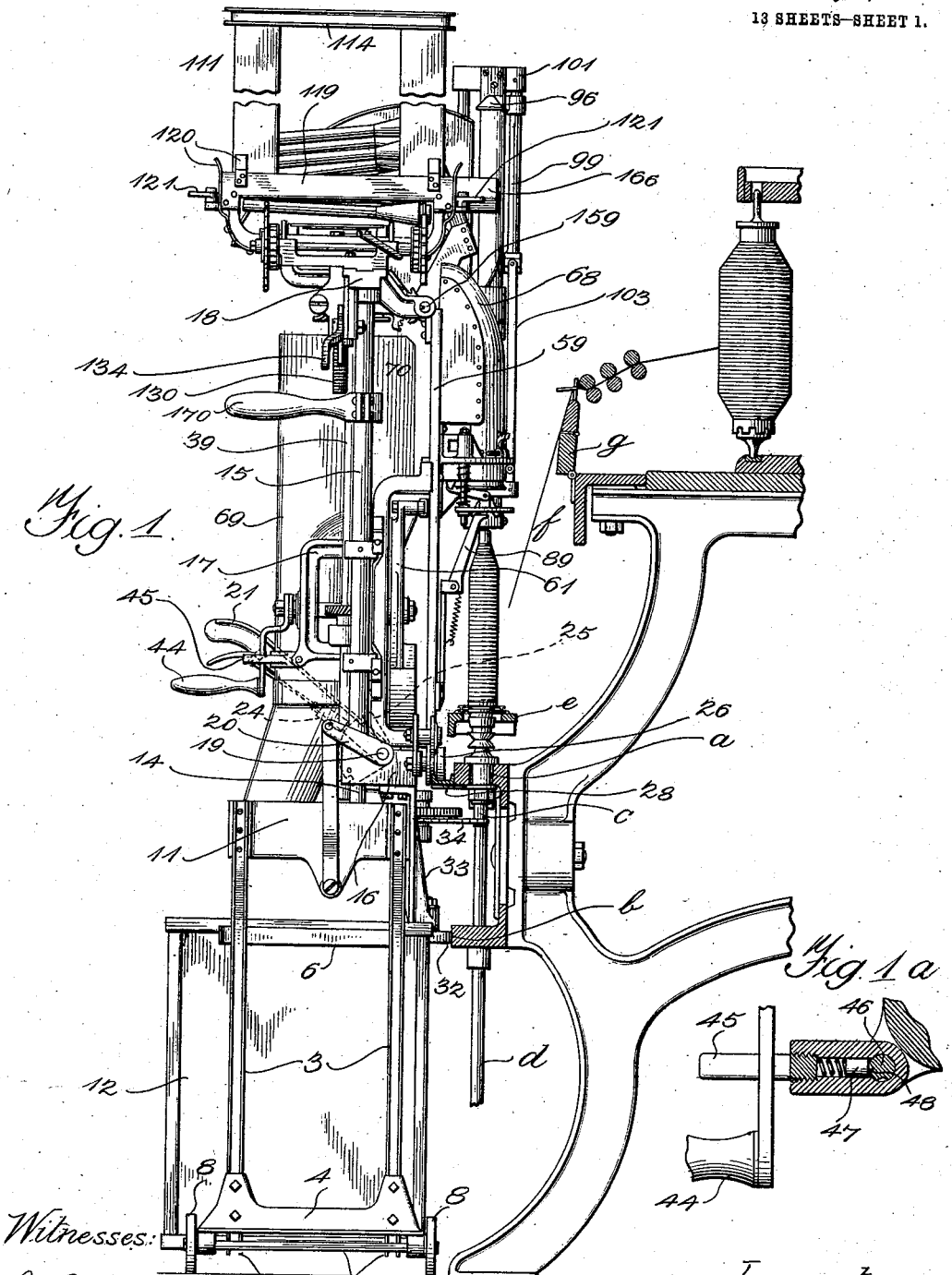

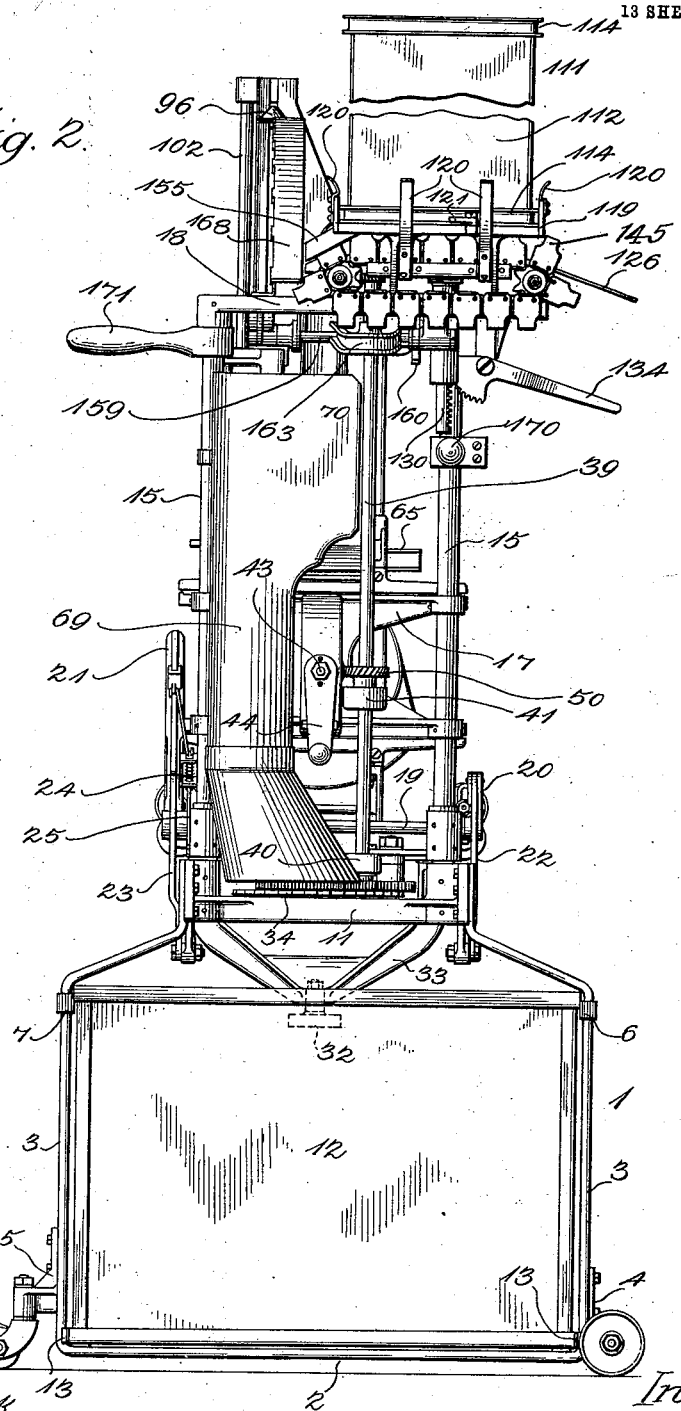

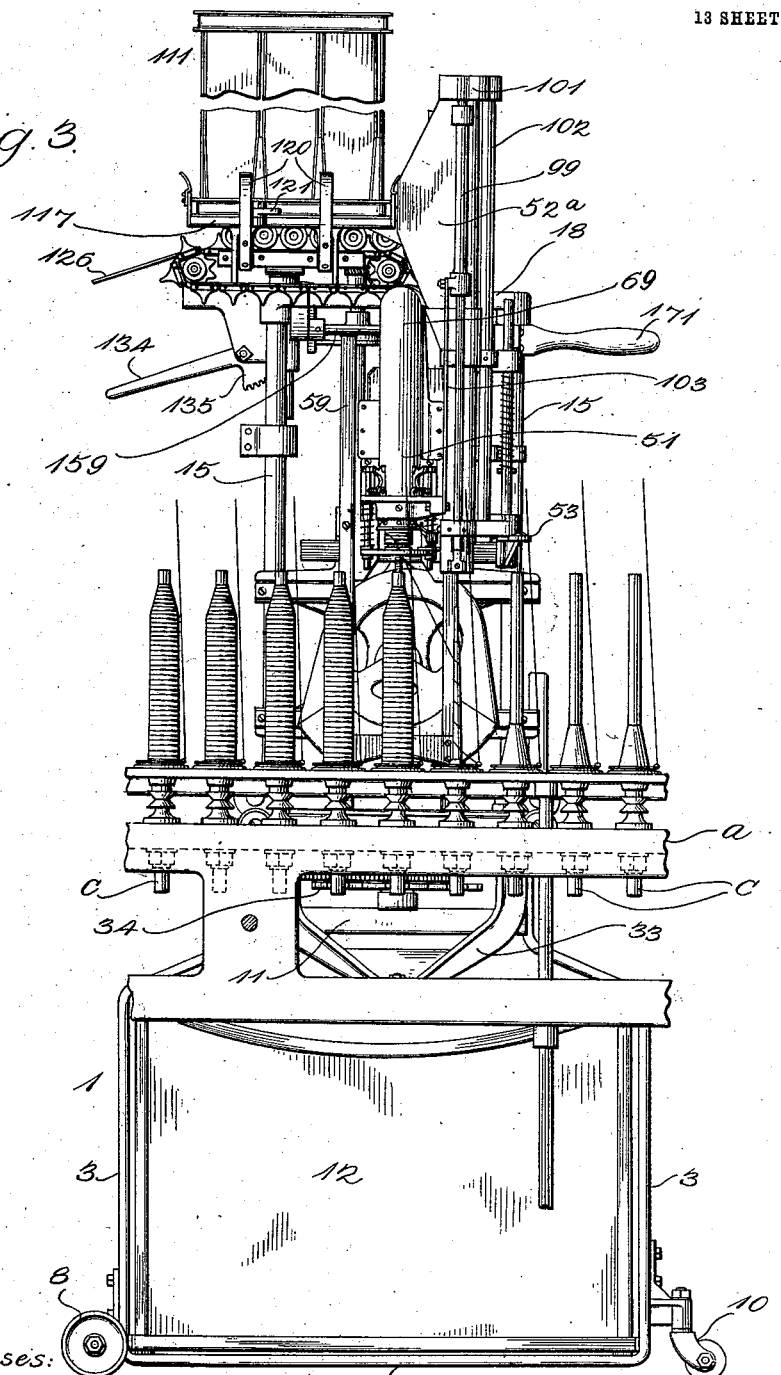

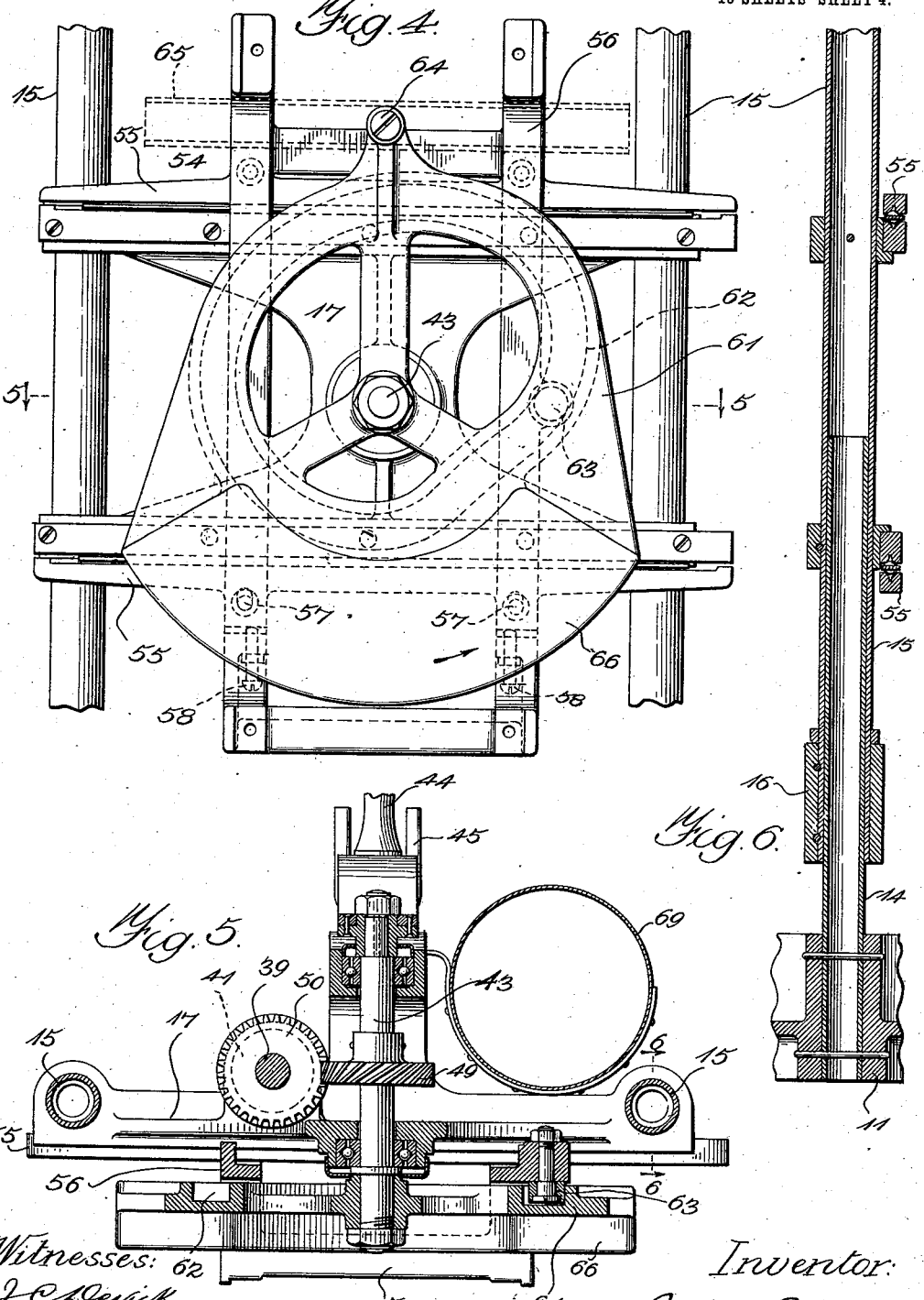

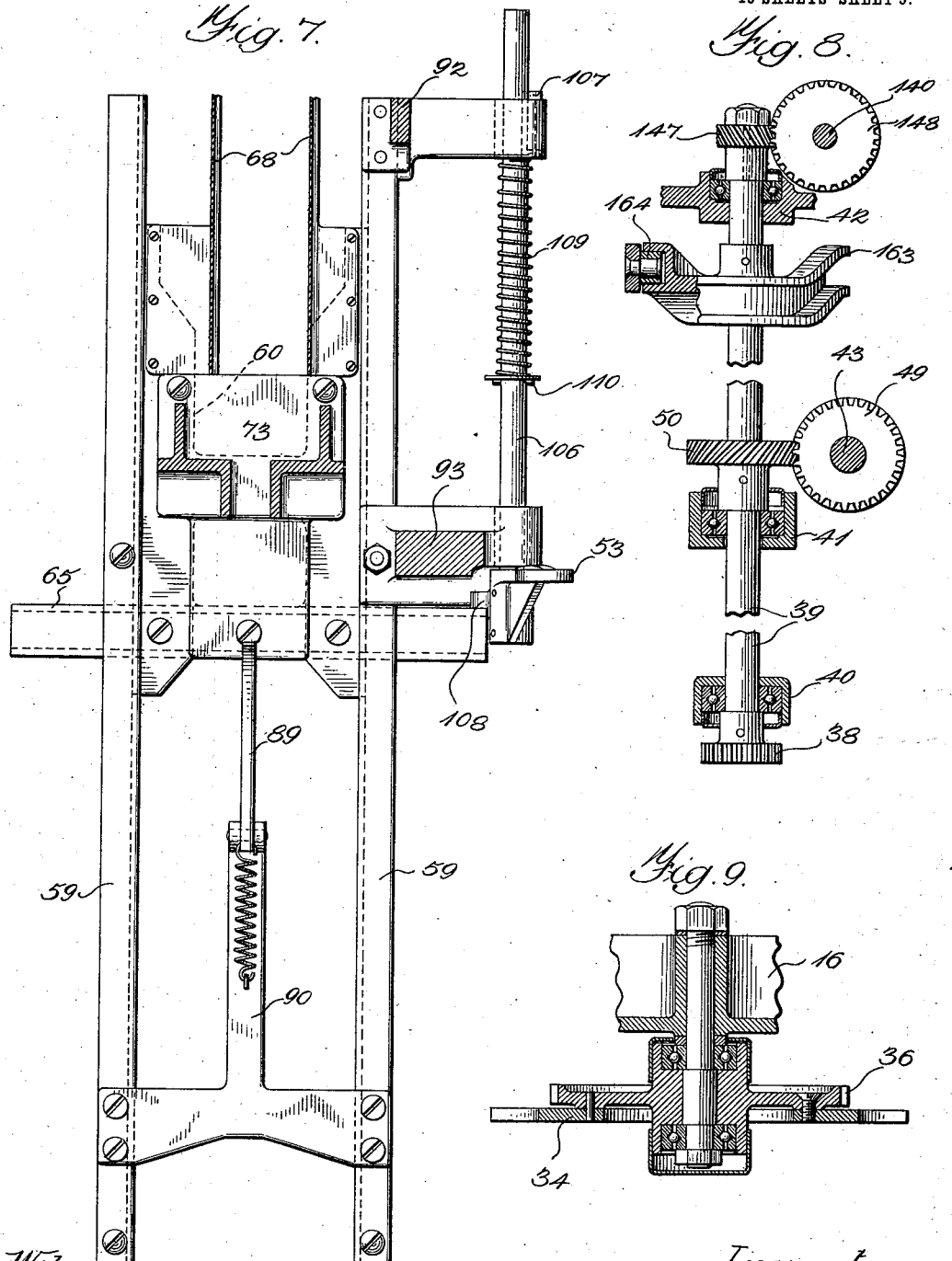

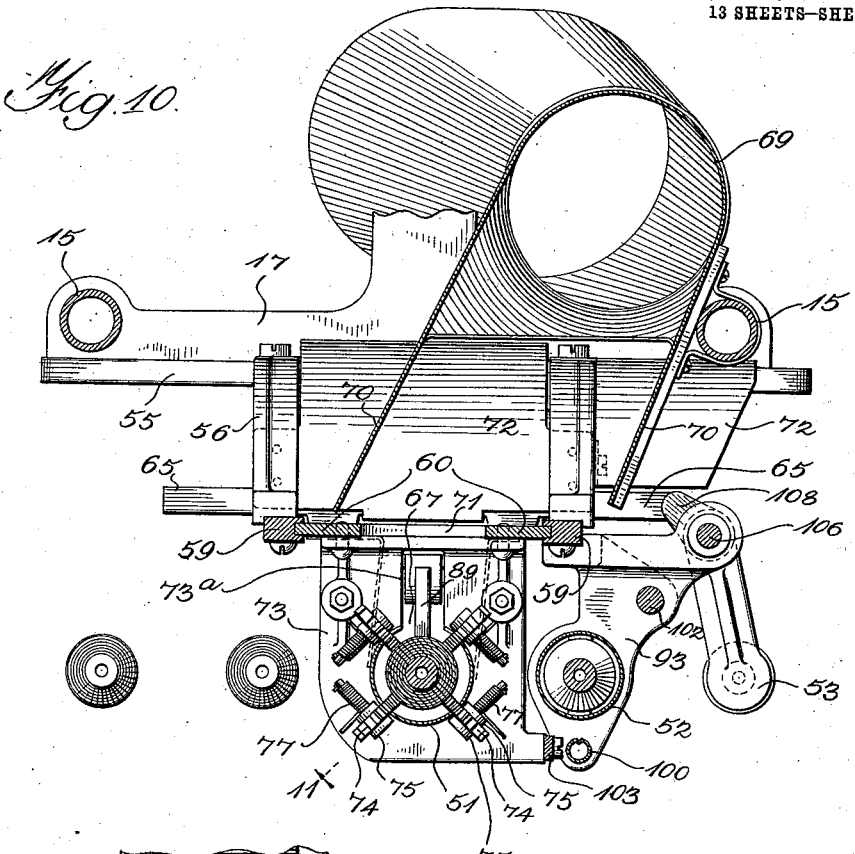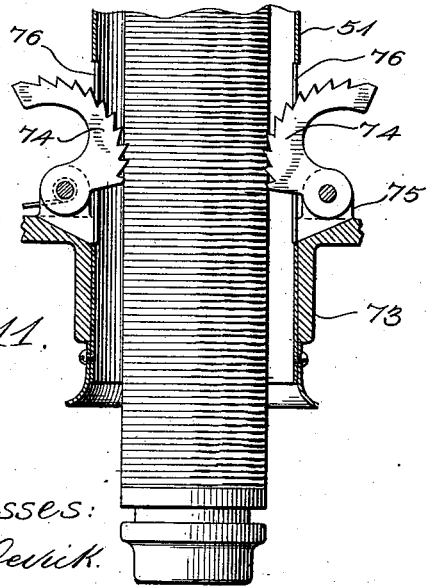

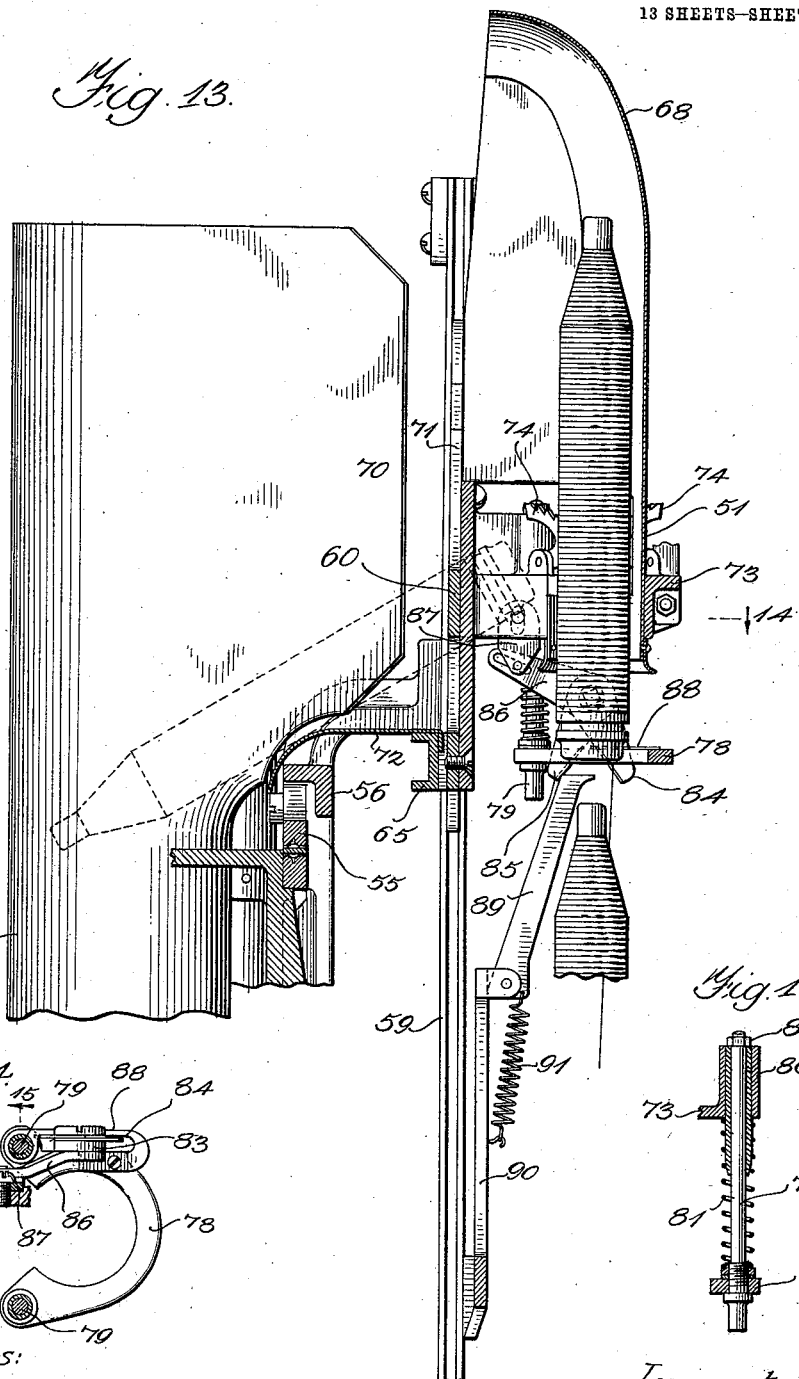

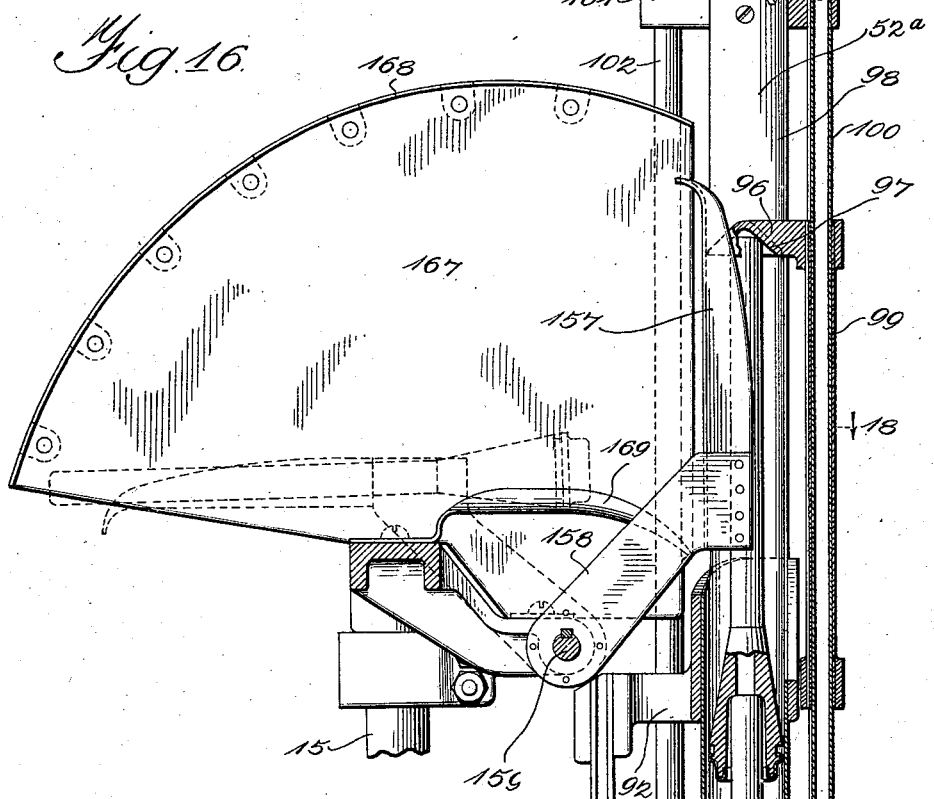

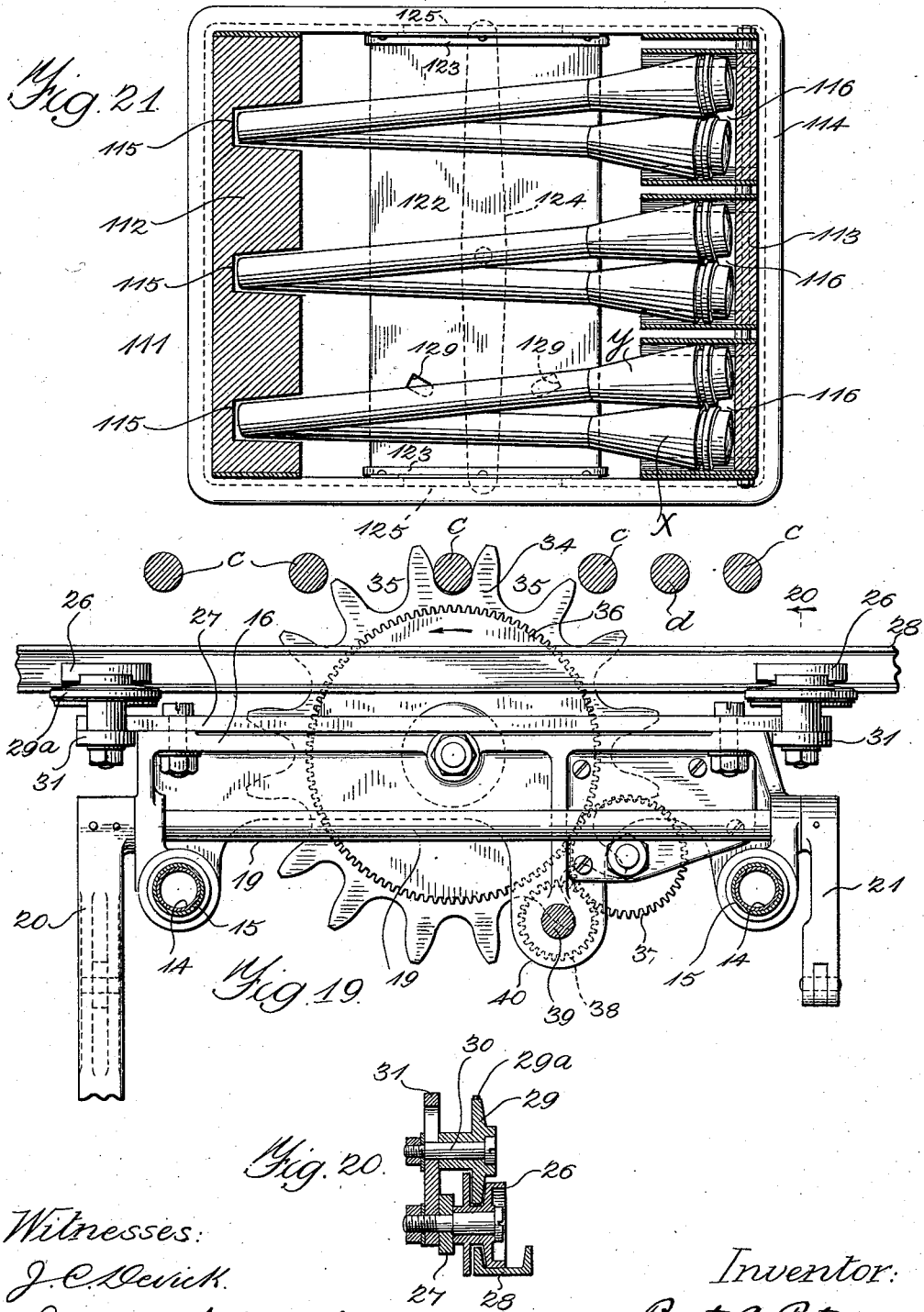

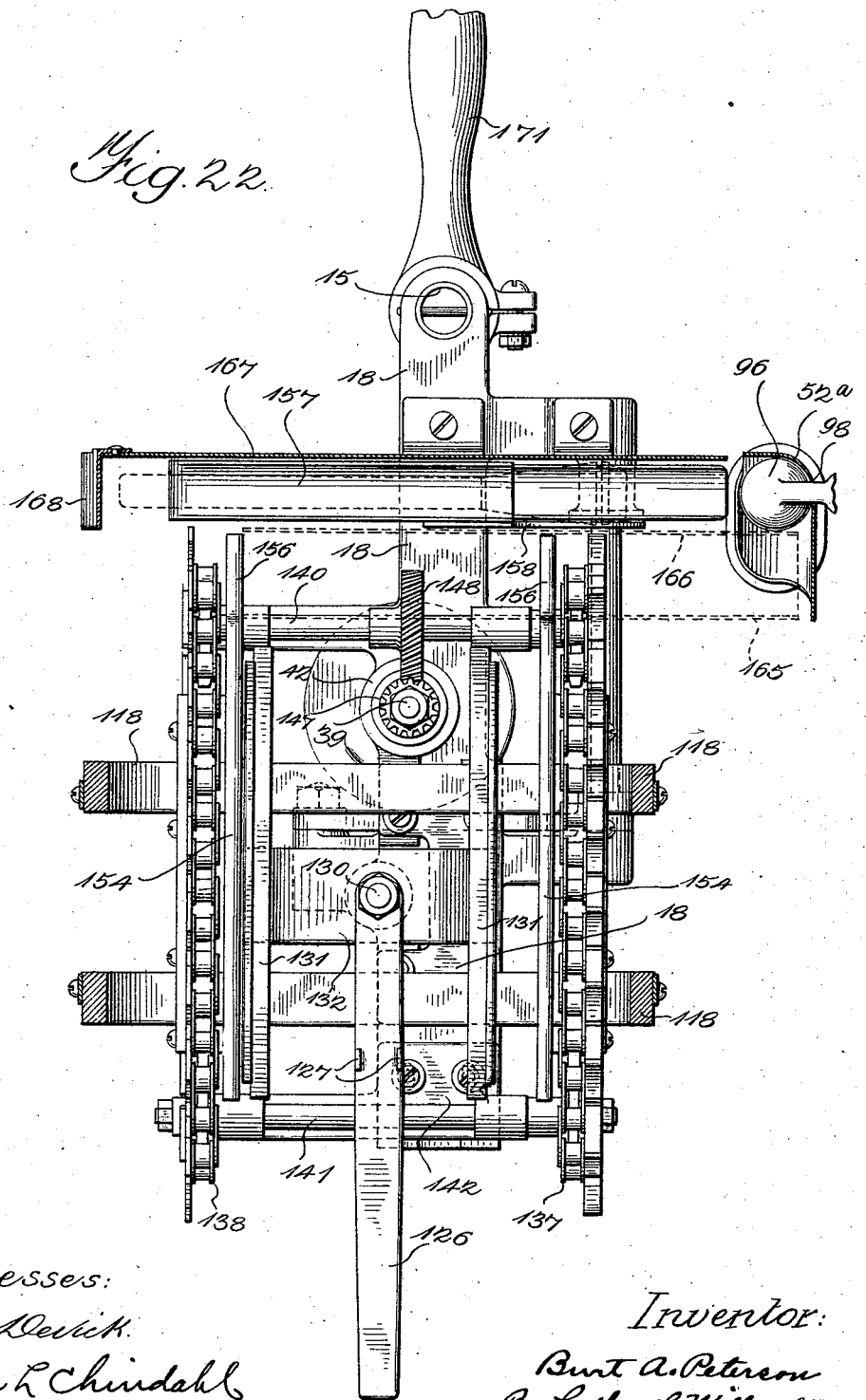

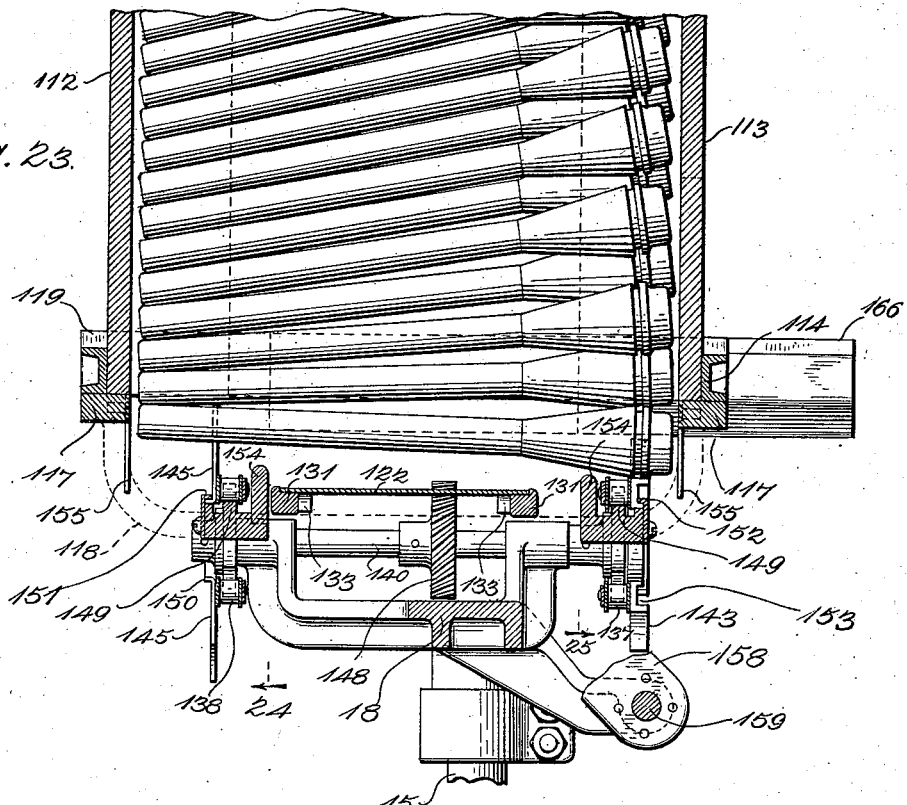
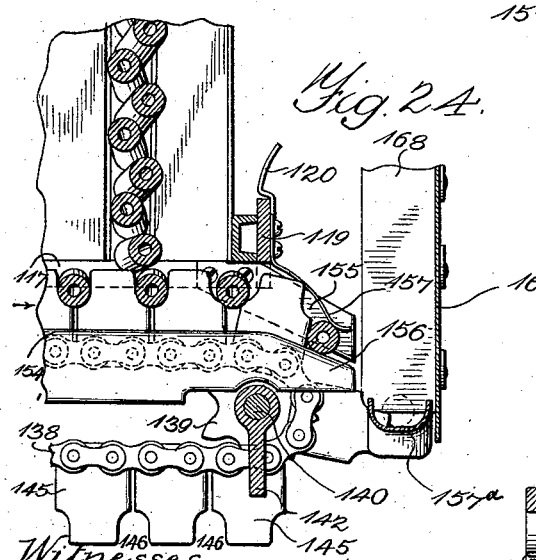
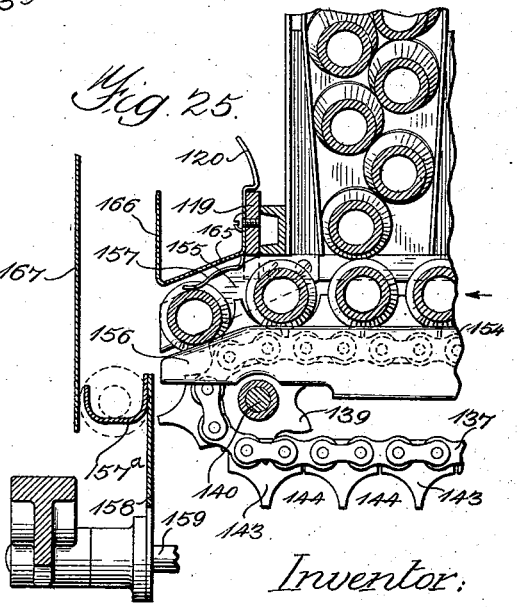

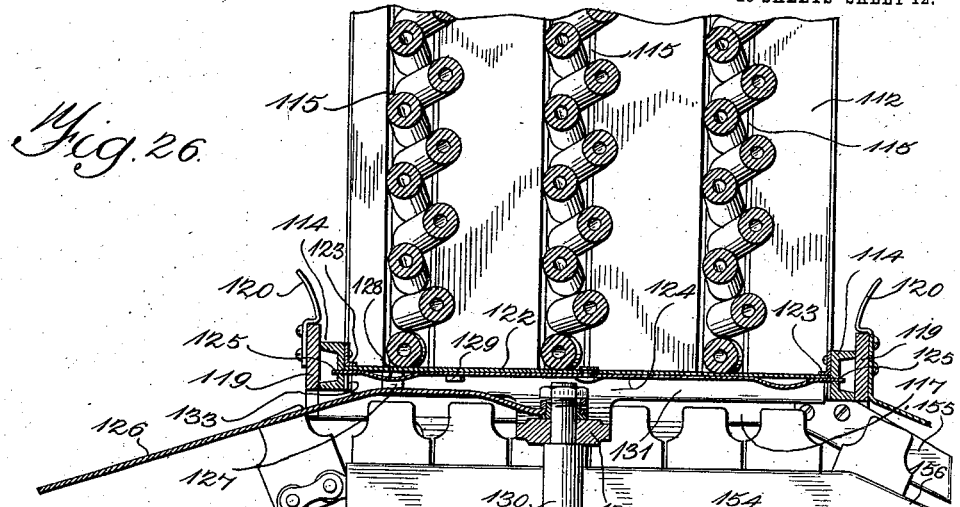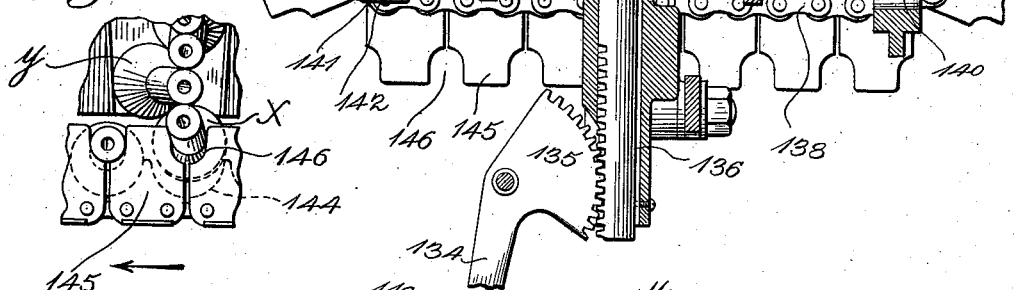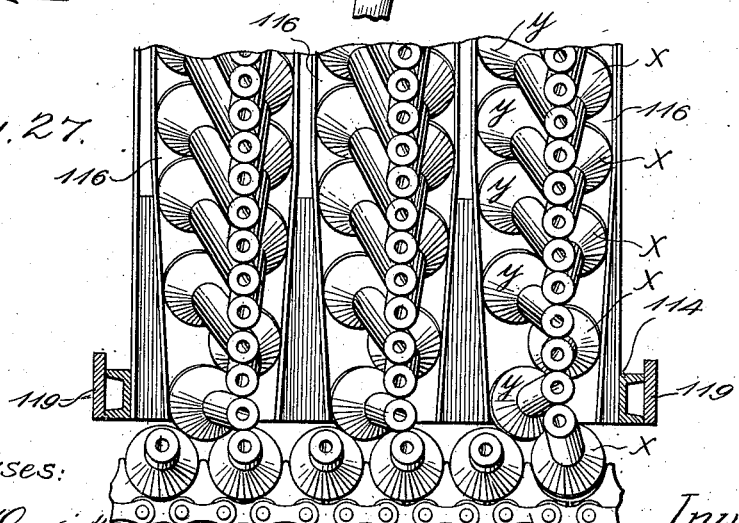

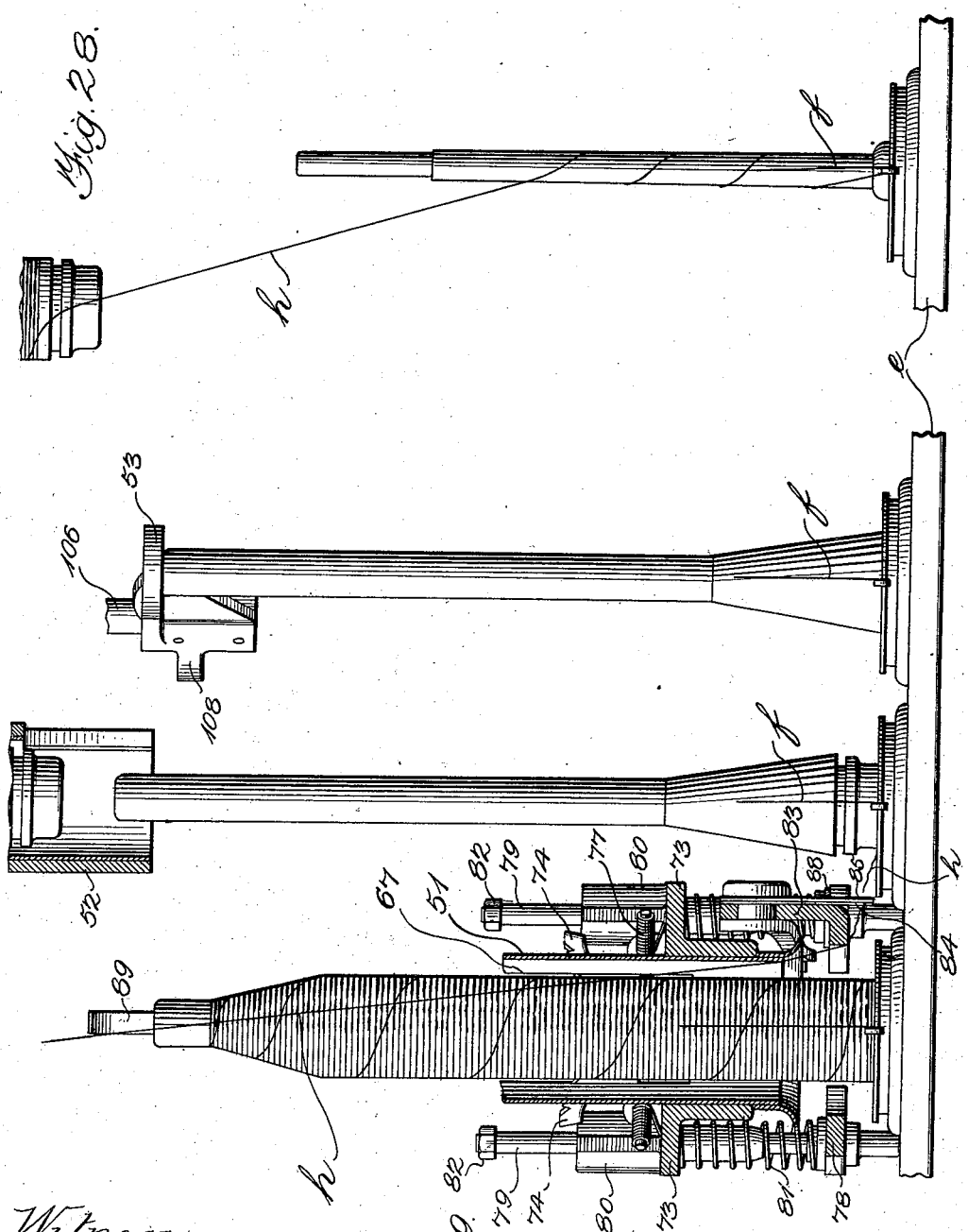

BURT A. PETERSON, OF ROCKFORD, ILLINOIS, ASSIGNOR TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

DOFFER.

1,067,058. Specification of Letters Patent. Patented July 8, 1913.

Application filed July 5, 1910. Serial No. 570,424.

*To all whom it may concern:*

Be it known that I, BURT A. PETERSON, a citizen of the United States, residing at Rockford, in the county of Winnebago and State of Illinois, have invented certain new and useful Improvements in Doffers, of which the following is a specification.

This invention relates to means for replacing the full bobbins upon a spinning frame with empty bobbins,—a process which is termed "doffing." It is herein exemplified as embodied in a doffer of the traveling type, *i. e.*, a machine adapted to travel along the front of a spinning frame and doff the bobbins successively.

One of the objects of the invention is to provide a doffer especially adapted to handle weft or "filling" bobbins.

Another object is to arrange the doffer so that the weight of the full-bobbin receptacle and its contents need not be supported upon the spinning frame.

The invention also relates to a magazine for empty bobbins, and particularly to means for opening and closing the lower end thereof.

The invention further relates to the other features of improvement hereinafter set forth.

In the accompanying drawings, Figure 1 is a side elevation of one form of doffer embodying my invention, the doffer being shown in operative relation to a spinning frame. Fig. 1ª is a vertical sectional view of a lock for the actuating crank. Fig. 2 is a front elevation of the doffer. Fig. 3 is a rear elevation of the doffer, together with a portion of the spinning frame. Fig. 4 is a rear view of a portion of the actuating mechanism. Fig. 5 is a sectional view taken in the plane of dotted line 5 5 of Fig. 4. Fig. 6 is a section on line 6 6 of Fig. 5. Fig. 7 is a rear view of a portion of the actuating mechanism, with parts in section. Fig. 8 is a fragmental view of the main shaft and related devices. Fig. 9 is a vertical section through the timing and actuating wheel and the gear wheel attached thereto. Fig. 10 is a horizontal sectional view of the doffing, donning and bobbin-seating devices. Fig. 11 is a section on line 11 of Fig. 10. Fig. 12 is a sectional detail of the actuating mechanism. Fig. 13 illustrates the doffing mechanism. Fig. 14 is a detail view of the shear. Fig. 15 is a sectional view of one of the pins or posts that connect the shear-supporting member to the doffing tube. Fig. 16 illustrates the donning devices. Fig. 17 represents the means for actuating a bobbin-moving device. Fig. 18 is a section on line 18 of Fig. 16. Fig. 19 is a horizontal section, illustrating the timing and actuating wheel in top plan. Fig. 20 is a section on line 20 of Fig. 19. Fig. 21 is a horizontal section through the magazine. Fig. 22 represents, in top plan, the conveyer that is arranged beneath the magazine. Fig. 23 is a fragmental vertical section through the magazine and said conveyer. Figs. 24 and 25 are sections on lines 24 and 25, respectively, of Fig. 23. Fig. 26 is a fragmental vertical section through the magazine and the conveyer, and showing the removable bottom for the magazine and the means for removing and replacing said bottom. Fig. 26ª is a fragmental view to illustrate how certain of the bobbins enter the conveyer. Fig. 27 is a sectional view to illustrate how the bobbins descend in the magazine and onto the conveyer. Fig. 28 represents the position of the yarn when a full bobbin is lifted off the spindle. Fig. 29 illustrates the operation of doffing, donning and seating bobbins.

In the embodiment herein shown of my invention, the operating mechanisms, the magazine for empty bobbins, and the receptacle for full bobbins are mounted upon a framework or carriage adapted to be moved along the sides of a spinning frame and also adapted to be rolled about the mill. The carriage consists of two sections, the lower one of which supports the full-bobbin receptacle and is arranged to travel upon the floor, while the upper section carries the operating mechanisms and the empty-bobbin magazine, and is adapted to be supported upon the spinning frame when in use and at other times upon the lower section.

The lower carriage-section 1 is herein shown, by way of example, as comprising two bars bent to form the bottom portions 2 and the side portions 3. Said bars are united by cross-pieces 4, 5, 6 and 7. Two carrying rollers 8 are mounted upon the axle 9 arranged in bearings on the cross-piece 4, and two casters 10 are attached to the cross-piece 5. The upper ends of the side bars 3 are rigidly secured to a frame member 11.

The full-bobbin receptacle 12 is of any suitable form and construction, and, as herein shown, it may be placed in the open frame formed by the parts 2, 3, 4, 5, 6 and 7, and rest upon the bottom members of said frame. Projections 13 (Fig. 2) on the box 12 stop against the side bars 3 when the box is inserted, and thus determine its proper position in the doffer.

The upper carriage-section is connected to the lower section for movement relative thereto in a suitable way. Herein I have shown two upright columns 14 (Fig. 19) fixed to the frame member 11, upon which columns the upper carriage-section is mounted for vertical movement. In this instance the upper carriage-section consists of two tubes 15 slidably surrounding the columns 14, a bottom cross-piece 16 (Figs. 1 and 19), a middle cross-piece or bracket 17 (Fig. 4) and a top cross-piece 18 (Figs. 2, 22 and 23), said cross-pieces being rigidly fixed to the tubes 15.

The means herein shown for raising and lowering the upper carriage-section consists of a rock shaft 19 (Fig. 19) mounted in the bottom cross-piece 16, two arms 20 21 fixed on the ends of said shaft, and links 22 23 connecting said arms to the frame member 11 of the lower carriage-section. The arm 21 is of sufficient length to serve as a hand lever in raising and lowering the upper section. If desired, means may be provided for locking the upper section against movement; I have herein shown a spring-actuated detent 24 on the hand lever 21 arranged to engage in a locking sector 25 fixed to the frame member 16, for locking the upper section in its upper and lower positions.

In the present embodiment, the upper carriage-section is arranged to be supported upon the spinning frame by means of two grooved rollers 26 (Figs. 19 and 20) mounted upon the ends of a bar 27 fixed to the bottom cross-piece 16. These rollers run on a channel-bar rail 28 attached to the spinning frame in any suitable manner adjacent to the forward edge of the bolster rail $a$. To keep the groove of the roller 26 clear of lint, I provide a disk 29 (Fig. 20) carried by a bolt 30 which is slidable in a slotted bracket 31 fixed to the bar 27. The disk 29 has a peripheral covering 29ª of felt or other material to which lint will cling. The disk 29 is supported in position to enter the groove in the roller 26, with its felt-covered periphery resting upon the bottom of the groove. Any lint picked up by the roller 26 will cling to the felt 29ª and may be readily stripped off by the operator.

32 is a roller carried by a bracket 33 fixed to the bottom cross-piece 16 and bearing against the lower flange $b$ of the bolster rail.

The timing and feeding mechanism that moves the doffer along the spinning frame and keeps it in step with the spindles comprises a star wheel or gear wheel 34 (Figs. 9 and 19) rotatably mounted in a horizontal position upon the lower side of the bottom cross-piece 16 in position to engage the spindle bases $c$, said bases constituting a rack with which the toothed wheel 34 engages. Said wheel may have double teeth, or, in other words, the ends of the teeth may be concave, as at 35, to clear the rods $d$ (Figs. 1 and 19) that carry the ring rail $e$.

Fixed with relation to the star wheel 34 is a gear wheel 36 meshing with an intermediate gear 37 that meshes with a pinion 38 rigidly mounted on the lower end of a vertical shaft 39. This shaft is supported in bearings 40 41 42 on the transverse frame members 16 17 18, respectively, (Figs. 2 and 8). In this instance the shaft 39 is arranged to be driven manually through a shaft 43 mounted in the bracket 17, the forward end of said shaft bearing a hand crank 44. When the machine is not in use, the mechanism may be locked against operation by suitable means such as a fork 45 (Fig. 1ª) adapted to embrace the crank and pivoted on a cross-pin 46 on the bracket 17. The fork is yieldingly held in operative position by a spring-pressed pin 47 in the fork, the operating end of said pin entering a recess 48 in the cross-pin 46. On the shaft 43 is a spiral gear wheel 49 meshing with a similar gear wheel 50 on the vertical shaft 39.

The upper carriage-section supports a doffing tube 51, a donning tube 52, and a bobbin-seater 53 (Figs. 10 and 29), said tubes and bobbin-seater being arranged side by side, the distance between the centers of said tubes, as well as the distance between the center of the donning tube and the operative portion of the bobbin-seater, being equal to the distance between the centers of adjacent spindles.

In operation, the doffer has a continuous movement along the spinning frame, while the doffing tube has an intermittent movement along the spinning frame, said tube moving downward over a filled bobbin and rising with said bobbin during each pause between the steps of its progressive movement along the spinning frame. The donning tube also moves intermittently along the spinning frame, pausing above each spindle while a bobbin is being ejected from the tube onto said spindle. The movements of the bobbin-seater are similar to those of the doffing tube. To obtain these various movements, I have provided mechanism which is herein shown as comprising a slide frame 54 (Fig. 4) consisting of two slides 55 secured to a frame 56. In the opposing faces of the slides 55 are formed ball races complementary to ball races formed in bars 17$^a$ fixed to the bracket 17, a series of spaced balls being provided in each pair of races. The lower slide 55 is secured to the frame 56 by screws 57 extending through elongated openings in said slide. Adjusting screws 58 seated in the frame 56 bear at their upper ends against the lower slide 55, and thus constitute means for adjusting the ball bearings for the slide frame 54. Fixed to the frame 56 are two vertical grooved guide bars 59 (Figs. 7, 10, 13 and 16) in which is mounted a slide 60, to which slide the doffing tube 51 is attached. The donning tube 52 and the bobbin-seater 53 are attached to the slide frame 54. The slide frame 54 is reciprocated horizontally upon the bars 17$^a$, its speed when moving in the direction opposite to the direction of movement of the doffer along the spinning frame being the same as that of the doffer, whereby during such movement the slide frame 54 is stationary with reference to the spinning frame. The means herein shown for horizontally reciprocating the slide frame 54 and for vertically reciprocating the slide 60 with relation to the slide frame 54 comprises a cam disk or wheel 61 (Figs. 4 and 5) secured to the rear end of the shaft 43. In one face of said wheel is a cam groove 62 to receive a roller stud 63 carried by the slide frame 54; and upon its opposite face is a roller stud 64 fitting in a channel bar 65 secured to the slide 60. The weight of the slide 60 and the parts carried thereby is counterbalanced by the weight-portion 66 of the cam wheel. The contour of the cam groove 62 is such that the slide frame 54 is stationary with reference to the spinning frame while a filled bobbin is being removed, and is then given a quick forward movement to place the doffing tube, the donning tube and the bobbin-seater in register with succeeding spindles.

The doffing tube is best shown in Fig. 13. Its forward side is cut away, as at 67 (Figs. 10 and 29), and its upper end merges into a curved guide portion 68 having an open forward side. Fixed in the upper carriage-section is a tube 69, the entrance end of which comprises guide walls 70 extending close to the plane of horizontal reciprocation of the plate 60. Said plate is cut away, as at 71. The gap between the plate 60 and the tube 69 is closed by curved guide plates 72. The lower portion of the tube 51 is secured to the plate 60 by means of a bracket 73.

In the present embodiment the means for engaging the full bobbins consists of dogs 74 (Fig. 11) with eccentric toothed gripping faces, said dogs being pivotally mounted between ears 75 upon the bracket 73, and extending into the doffing tube through slots 76 formed in said tube. The dogs in their downward movement strike against the bracket 73, unless previously stopped by engagement with a filled bobbin, and their upward and outward movement is restrained by coiled springs 77.

A bracket 78 (Fig. 14) in the form of an incomplete ring is mounted for movement with relation to the tube 51 by means of two posts 79 fixed to said bracket and vertically slidable in bearings 80 (Fig. 29) on the bracket 73. Coiled springs 81 surrounding the posts 79 and extending between the brackets 73 and 78 tend to push the bracket 78 downward, such movement being limited by the engagement of the nuts 82 with the upper ends of the bearings for the posts 79. When the doffing tube descends, the lower ends of the posts 79 strike the ring rail $e$, the downward movement of the bracket 78 being thereby arrested, while the doffing tube continues to descend. In its downward movement, the annular bracket 78 contacts the thread extending from the drawing rolls to the traveler, and pushes said thread down in order that it may not be engaged by the dogs 74.

The relative movement between the bracket 78 and the doffing tube 51 is utilized to actuate a shear (see Figs. 13, 14 and 29). On the following side of the bracket 78 is an upstanding lug 83 to which is fixed a shear blade 84, and pivoted on said lug is a shear blade 85. Fixed with relation to the pivoted blade 85 is an operating arm 86 having a pin and slot connection with a member 87 adjustably secured to the bracket 73. It will be seen that approaching movement between the brackets 73 and 78 will cause the shear to be closed, and that as the doffing tube moves up away from the bracket 78 the shear will be opened.

88 is a guard fixed to the bracket 78, the thread to be cut extending under said bracket. The guard 88 insures an invariable position of the thread when being cut and thus provides a fixed time for the cutting of the thread.

When the doffing tube 51 is moved downwardly over a bobbin, the dogs 74 yield outwardly and upwardly, and upon the next upward movement of the tube the bobbin, being held by the dogs, is pulled from the spindle. On the next downward movement of the tube 51, this bobbin is held from downward movement with the tube by means of a finger 89 (Figs. 7 and 13) pivoted on a bracket 90 fixed to the guides 59. A coiled spring 91 tends to hold the finger 89 in the path of the bobbins, but permits the finger to yield to allow the bobbin to pass upwardly. In the downward movement of the tube the bobbin is stopped by the finger 89, and as the tube continues its descent the curved guide portion 68 tips the bobbin forwardly through the space 71 and into the tube 69, through which it drops into the box 12. It will be seen that if the doffed bobbin were carried down with the tube 51, the butt of said bobbin would pass onto the tip of the bobbin next to be doffed, whereby the doffed bobbin would be held from turning, and could not be ejected by the curved portion 68.

To provide space to receive the ejectors 89 when the doffing device descends, the bracket 73 is slotted at 73ᵃ, the doffing tube is slotted at 67, and the bracket 78 is open at its forward side. (See Figs. 10 and 17).

The donning tube 52 is secured to the slide frame 54 so as to reciprocate horizontally with said frame, by brackets 92 93 (Figs. 7 and 16). Said tube, with its upper extension 52ᵃ, is of sufficient height to contain two bobbins, one superposed upon the other. Mounted in operative relation to the lower end of the donning tube is means for yieldingly closing the tube against the exit of bobbins, said means, in this instance, consisting of two spring fingers 94 extending through slots 95 in the tube. The bobbins are forced downwardly, one by one, past said fingers by an ejector 96 recessed as at 97 to receive the tip of a bobbin, said ejector extending through a slot 98 formed in the extension 52ᵃ, and being fixed to a sleeve 99 which is slidable on a guide rod 100. The upper end of the guide rod 100 and the upper end of the extension 52ᵃ are secured to a bracket 101, said bracket being secured to a brace rod 102 fixed in the brackets 92 93. As shown in Fig. 16, the ejector 96 ejects the lower one of the two bobbins in the tube 52 by pressing the other bobbin down. The ejector is reciprocated through the medium of a link 103 (Figs. 1 and 3) that connects the sleeve 99 with the brackets 73. The ejector is held from turning on the rod 100 by a rib 104 on the sleeve 99 fitting in a groove 105 in the rod 100. See Fig. 18.

The bobbin-seater 53 (Fig. 7) is fixed to the lower end of a rod 106 which is slidable in bearings on the brackets 92 93. A spline 107 fitting within a groove in the rod 106 prevents the latter from turning. 108 is a projection on the bobbin seater arranged to be engaged by one end of the channel bar 65. A coiled spring 109 bearing at its ends against the bracket 92 and a pin 110 in the rod 106 tends to move said rod and the bobbin seater downward. When the crank pin 64, working in the channel bar 65, moves the doffing tube downward, the spring 109 drives the bobbin seater 53 against the tip of a bobbin theretofore discharged from the donning tube, and causes said bobbin to be frictionally engaged with its spindle. As the doffing tube rises, the channel bar 65 strikes the projection 108 and lifts the bobbin-seater against the tension of the spring 109.

The empty bobbins with which the full bobbins are to be replaced are contained in a magazine 111. The form of magazine herein shown comprises a body consisting of front and rear walls 112 113 (Fig. 21) united by top and bottom frames 114. In this instance the bobbins are arranged within the magazine in three tiers, the tips of the bobbins lying within vertical grooves 115 in the wall 112, while the butts of the bobbins lie within compartments 116 formed in the rear portion of the magazine. It will be seen from Fig. 27 that the compartments 116 are not wide enough for two bobbins to lie side by side, and that therefore the bobbins are staggered or overlie one another to some extent. For convenience in removing the bobbins singly from the respective compartments, the compartments are made somewhat narrower at their lower ends so that as they descend in the compartments they approach a position of vertical alinement.

The magazine 111 is removably held upon a seat comprising, in this instance, two rails 117 (Fig. 23) cast integral with two curved arms 118, these arms being secured to the top frame member 18. To the ends of the rails 117 are fixed transverse rails 119. To assist the operator in correctly positioning the magazine upon its seat, a plurality of guides 120 is fixed to the rails 117 119. Pivoted latches 121 (Figs. 2 and 3) may be provided on the rails 117 to engage between the flanges of the channel bar constituting the lower frame 114, and thus lock the magazine in place upon its seat.

In operation, the bobbins in the magazine rest upon a bobbin-feeding means located below the magazine and virtually forming the bottom of the latter. In order that the magazine may be conveniently loaded before it is placed on the doffer, the magazine is provided with a bottom 122 (Figs. 21 and 26) adapted to fit between opposite sides of the lower frame 114 and against stop flanges 123 on said frame. A locking bar 124 is pivoted at its midportion upon the lower side of the bottom 122, the ends of said bar being adapted to enter slots 125 in the lower frame 114.

Means is provided for removing and replacing the bottom 122 while the magazine is in place upon the doffer, said means, in the present embodiment, comprising a hand lever 126 having thereon projections 127 adapted to lie at opposite sides of a projection 128 on the locking bar 124. The pivotal movement of the latter bar is limited by stops 129 on the bottom 122. The lever 126 is pivoted on a rod 130 that has fixed thereto a support for the bottom 122, said support consisting of two rails 131 and a connecting arm 132 (Figs. 22, 23 and 26). As shown in Fig. 23, the rails 131 are flanged to prevent lateral displacement of the bottom with respect to said rails. Longitudinal displacement of the bottom relatively to the rails 131 is prevented by down-turned flanges 133 on the bottom adapted to lie against the ends of the rails. The support for the bottom 122 is vertically movable by means of a hand lever 134 pivoted in a bracket fixed to the top frame member 18, said hand lever being fixed with relation to a gear segment 135 that meshes with rack teeth cut in the rod 130. Said rod is held from turning by a spline 136 (Fig. 26) fitting in a key-way in the rod.

After the magazine has been placed upon its seat in the doffer, the operator raises the support 131 131 into contact with the bottom 122 by depressing the lever 134, at the same time positioning the lever 126 so that the lugs 127 shall lie at opposite sides of the projection 128. Holding the bottom-support against the bottom, the operator swings the lever 126 to withdraw the ends of the locking bar 124 from the slots 125, and then lowers the bottom-support until it rests on the arms 118, as indicated in Fig. 23. When the bottom 122 is thus being withdrawn, the bobbins settle onto the bobbin-removing means. When the magazine is to be removed from the doffer, the bottom 122 is first replaced by operating the levers 126 and 134.

In the present embodiment, the bobbin-removing means consists of a conveyer formed of two endless chains 137 138 mounted upon sprocket wheels 139, two of said sprocket wheels being fixed upon a shaft 140, and the other two being mounted on a shaft 141. The shaft 140 is carried by bearings on the top frame member 18, while the shaft 141 is mounted in bearings on a bracket 142 adjustably secured to said top frame member, so that slack in the chains may be taken up. The chain 137 has fixed thereto lugs 143 (Fig. 25) adapted to form recesses 144 between them for the reception of the butts of the bobbins; and the chain 138 carries lugs 145 (Fig. 24) providing recesses 146 to receive the tips of the bobbins. The conveyer is driven through a spiral-gear connection (147 148) between the shafts 39 and 140.

Between the sprocket wheels the upper runs of the chains are supported upon rails 149 (Fig. 23) cast integral with the arms 118. Upward displacement of the chain 138 is prevented by lugs 150 on the plates 145 underlying a flange 151 fixed to the adjacent rail 149. A similar flange 152 attached to the other rail lies within a groove 153 formed in the lugs 143 and prevents upward displacement of the chain 137. 154 are guard rails cast integral with the rails 149 and extending along the upper runs of the conveyer chains. At the discharge end of the conveyer are guard plates 155 fixed to the bars 117. As the conveyer chains pass around the sprocket wheels the bobbins are deposited upon the inclined ends 156 of the rails 154, and pushed down said inclined ends by the lugs 143 145, springs 157 preventing the bobbins from rolling freely down the inclines.

It will be seen from Fig. 27, that the lower bobbins of all of the tiers will drop onto the conveyer, as the latter is operated, until all of the spaces in the upper side thereof are full, and that thereafter the conveyer will remove bobbins from the tiers in succession, the right-hand tier being first exhausted, the middle tier next, and finally the left-hand tier.

As shown in Figs. 21 and 27, the butts of alternate bobbins $x$ in a tier or column lie nearer to the side from which the conveyer approaches than the tips of said bobbins. The tip-receiving recesses in the conveyer are directly opposite the butt-receiving recesses in said conveyer, therefore it will be seen that the butt-receiving recess reaches the butt of a bobbin $x$ before the tip-receiving recess reaches the tip of said bobbin. When the column contains a considerable number of bobbins the weight of the bobbins exerted upon the tip of the lowermost bobbin $x$ balances said bobbin upon the lug 145 passing beneath the bobbin, and prevents the butt of said bobbin from dropping into its recess; therefore in order that the bobbin shall be free to descend before the butt-receiving recess has passed too far along, I arrange the spaces 115 and 116 as shown in Fig. 21. It will be seen that the spaces 115 are not directly opposite the spaces 116, but on the contrary are advanced toward the side from which the conveyer approaches, thus reducing the angle between the bobbins $x$ and the conveyer; or, in other words, the construction shown places the bobbins $x$ more nearly at right angles to the conveyer than they would be if the spaces 115 were directly opposite the spaces 116. Such displacement of the spaces 115 toward the receiving end of the conveyer throws the bobbins $y$ farther out of the ideal right-angular relation to the conveyer than if the spaces 115 were directly opposite the spaces 116, but this does not interfere in any way with the feeding of the bobbins $y$ onto the conveyer.

It will be seen from Fig. 26$^a$ that when the tip of the bobbin $x$ drops into the recess 146 the butt of said bobbin can settle into the recess 144.

The bobbins discharged by the conveyer are received in a tray 157$^a$ fixed to an arm 158, said arm being fast on a shaft 159 (Fig.

16). Said shaft is rocked to place the bobbins in the donning tube 52 by means of a gear segment 160 (Fig. 17) pivoted at 161 and meshing with a gear segment 162 fixed on the shaft 159. The segment 160 is rocked by a cam 163 operating on a roller stud 164 carried by said segment.

A guard plate 165 overlies the path taken by the bobbins in passing from the conveyer to the tray, and a guard 166 extends at one side of the path of movement of the tray. At the opposite side of the tray is a guard 167 having a flange 168 thereon. 169 is a plate closing the space between the donning tube and the receiving position of the tray. The bobbins are discharged singly by the conveyer in a horizontal position, and are transferred to the donning tube and given an upright position by the tray 157$^a$.

170 and 171 are handles fixed to the tubes 15 and adapted for use in moving the doffer about and placing it in operative relation to the spinning frame.

When the bobbins upon a spinning frame are ready to be doffed, the ring rail $e$ is stopped in its lowermost position, and a few turns of yarn are spun around the lower ends of the bobbins. The spinning frame is then stopped, and the thread-board $g$ thrown back.

The crank 44 being in its locked position, a magazine 111 is placed upon the doffer, and the bottom 122 of the magazine unlocked and lowered. The crank 44 is then unlocked and operated until the bobbin conveyer and the donning tube are properly supplied with bobbins. The crank is again locked in the position shown in Fig. 1, wherein the mechanism is in its initial position, with the doffing tube elevated, and the doffer placed in operative relation to the spinning frame, the lower carriage-section standing upon the floor, and the upper carriage-section being supported upon the rail 28. The doffer may now be actuated and fed continuously along the spinning frame by operating the crank 44.

As the doffing tube 51 moves downward over a full bobbin, the dogs 74 swing outwardly upon their pivots to pass the bobbin. On the upward movement of the tube, the dogs engage the yarn on the bobbin and cause the bobbin to rise with the tube. As the tube is moved downward over the next bobbin, the bobbin just lifted is forced from the tube by the ejector 89 and directed by the curved portion 68 into the tube 69, which conducts it to the box 12.

Referring now to Figs. 28 and 29: As the bobbin is lifted off its spindle by the tube 51, a few wraps of the thread that was wound around the lower end of the bobbin are transferred from the bobbin to the spindle, as shown in Fig. 28, so that when an empty bobbin is placed on the spindle the thread will be caught and held by it. As the slide frame 54 is moved forward with relation to the spinning frame, the doffing tube 51 is moved into position over the next adjacent bobbin. When the tube 51 is lowered onto the last mentioned bobbin, the thread portion $h$ running from the previously doffed bobbin to the spindle from which it was removed enters the shear and is severed as the doffing tube completes its downward movement. Owing to the circular form of the bracket 78, the thread portion $h$ assumes a straight line between its spindle and the doffing device as the latter is moved laterally away from said spindle; consequently said thread portion is in position to enter the open shear as the shear descends. Simultaneously with the descent of the doffing tube and an instant before the shear is actuated, an empty bobbin is discharged from the tube 52 onto the bare spindle, said empty bobbin clamping the thread between itself and the spindle. The next progressive movement of the slide frame 54 brings the bobbin seater 53 into vertical alinement with the empty bobbin just referred to, said bobbin-seater in its next downward movement pressing the bobbin firmly onto its spindle.

While I have described the present embodiment of my invention with considerable particularity, it will be understood that the invention is not limited to the details herein set forth.

I claim as my invention:

1. In a doffer of the traveling type, a supporting framework comprising a lower and an upper section, the lower section having means for supporting it to travel upon the floor, and the upper section having means for supporting it to travel upon a spinning frame, and a connection between said sections arranged to permit relative movement between the sections, the lower section serving to completely support the upper section in upright position when the upper section is withdrawn from the spinning frame.

2. In a doffer of the traveling type, a supporting framework comprising a lower and an upper section, the lower section having means for supporting it to travel upon the floor, and the upper section having means for supporting it to travel upon a spinning frame, and columns fixed to the lower section, the upper section comprising sleeves vertically slidable upon said columns.

3. In a doffer of the traveling type, a supporting framework comprising a lower and an upper section, the lower section having means for supporting it to travel upon the floor, and the upper section having means for supporting it to travel upon a spinning frame, columns fixed to the lower section, the upper section comprising sleeves vertically slidable upon said columns, and means for vertically moving the upper section with relation to the lower section.

4. In a doffer of the traveling type, a supporting framework comprising a lower and an upper section, the lower section having means for supporting it to travel upon the floor, and the upper section having means for supporting it to travel upon a spinning frame, columns fixed to the lower section, the upper section comprising sleeves vertically slidable upon said columns, a rock shaft mounted in one of the sections, an arm on said rock shaft, a link connection between said arm and the other section, and means for rocking said shaft.

5. In a doffer of the traveling type, a supporting framework comprising an upper and a lower section, a connection between said sections arranged to permit relative movement between the sections, a rock shaft mounted in one of the sections, an arm on said shaft, a link connection between the arm and the other section, and means for rocking the shaft.

6. In a doffer of the traveling type, a supporting framework comprising a lower section and an upper section, the upper section having means for supporting it to travel upon a spinning frame, a connection between said sections arranged to permit relative movement between the sections, the lower section being in the form of a frame, rollers supporting said frame to travel upon the floor, a box for full bobbins adapted to be removably inserted into said frame, two columns fixed to the frame of the lower section, the upper section comprising sleeves which are vertically slidable upon said columns, and means for vertically moving the upper section with relation to the lower section.

7. In a doffer of the traveling type, a supporting framework comprising a lower section and an upper section, the lower section having means for supporting it to travel upon the floor, and the upper section having means for supporting it to travel upon a spinning frame, a connection between said sections comprising two columns fixed to the lower section, the upper section consisting of two tubes which are vertically slidable upon said columns, a lower cross-piece, a middle cross-piece, and an upper cross-piece rigidly connecting said tubes, a vertical shaft supported by said cross-pieces, a timing and feeding element mounted upon the lower cross-piece, and geared to said vertical shaft, a horizontal crank shaft carried by the middle cross-piece, and geared to said vertical shaft, and bobbin-supplying means carried by said upper cross-piece and arranged to be driven by said vertical shaft.

8. In a doffer, a vertically-reciprocatory doffing element adapted to releasably grasp a bobbin, and a bobbin detaining member on the doffer arranged to lie in the path of the bobbin held by said doffing element and cause the bobbin to be ejected from said doffing element in the downward movement of the latter.

9. In a doffer, a bobbin magazine comprising a body, a bottom removably fitting within the lower end of the magazine body, said bottom having at two opposite edges downwardly extending flanges fitting within the body, stops within the body for determining the operative position of the bottom, the lower end of the body having slots, and a locking bar pivoted at its middle on the lower side of the bottom and arranged to extend through said slots to lock the bottom to the body.

10. In a doffer, a removable bobbin magazine having a removable bottom, a bobbin-conveyer located below the magazine and comprising two parallel chains adapted to support the bobbins contained in the magazine, and means for withdrawing the bottom into the space between the chains and below the supporting surface of the chains.

11. In a doffer, a carriage framework, means for moving said framework along a spinning frame, a structure mounted to reciprocate horizontally with relation to said framework, a part mounted to reciprocate vertically with relation to said structure, a doffing element carried by said part, means carried by said structure for ejecting bobbins from said doffing element, and means for reciprocating said structure and said part.

12. In a doffer, a carriage framework, means for moving said framework along a spinning frame, a structure mounted to reciprocate horizontally with relation to said framework, a part mounted to reciprocate vertically with relation to said structure, a doffing element carried by said part, means carried by said structure for preventing downward movement of a doffed bobbin with said doffing element, and means for reciprocating said structure and said part.

13. In a doffer, a carriage framework, means for moving said framework along a spinning frame, a structure mounted to reciprocate horizontally with relation to said framework, a part mounted to reciprocate vertically with relation to said structure, a doffing element carried by said part, a bobbin-ejector located on said structure in the path of the doffing element, and means for reciprocating said structure and said part.

14. In a doffer, a carriage framework, means for moving said framework along a spinning frame, a structure mounted to reciprocate horizontally with relation to said framework, a part mounted to reciprocate vertically with relation to said structure, a doffing element carried by said part, a bobbin-ejector yieldingly mounted on said structure in the path of the doffing element, said ejector yielding to permit a bobbin to pass upward, and being adapted to spring into operative position beneath the lifted bobbin, and means for reciprocating said structure and said part.

15. In a doffer, a vertically-reciprocatory part, a doffing tube, a bracket securing said tube to said part, bobbin-engaging means mounted in operative relation to said tube, and a relatively stationary bobbin-ejector located in the path of said tube, said tube and said bracket being vertically slotted to pass said ejector.

16. In a doffer, a reciprocatory bobbin-engaging means, a member mounted below and reciprocable with said bobbin-engaging means, a shear carried by said member, an arm fixed to the movable element of the shear, and a pin-and-slot connection between said arm and said bobbin-engaging means for opening and closing said shear.

17. In a doffer, a vertically reciprocatory part, a bracket on said part, a tube carried by said bracket, bobbin-engaging means carried by said bracket, a member having a generally circular form, two posts fixed in said member and extending slidably through said bracket, means for limiting the movement of said posts with relation to said bracket in one direction, and spring means tending to separate said bracket and said member.

18. In a doffer, a vertically-reciprocatory part, a bracket on said part, a tube carried by said bracket, bobbin-engaging means carried by said bracket, a member having a generally circular form, two posts fixed in said member and extending slidably through said bracket, means for limiting the movement of said posts with relation to said bracket in one direction, and spring means tending to separate said bracket and said member, the lower ends of said posts forming stops to engage the ring rail of the spinning frame to determine the operative position of said member above the ring rail.

19. In a doffer of the traveling type, a carriage framework, operating mechanism on said framework, and means on the doffer for locking the mechanism in its initial position.

20. In a doffer of the traveling type, a carriage framework, a shaft supported in said framework, and provided with a hand crank for actuating the doffer, operating mechanism arranged to be driven by said shaft, and means on the doffer for releasably locking said crank against rotation.

21. In a doffer of the traveling type, a carriage framework, a shaft supported in said framework and provided with a hand crank for actuating the doffer, operating mechanism arranged to be driven by said shaft, a locking fork pivoted on the carriage framework and adapted to embrace the crank, and means for releasably holding said fork in operative position.

22. In a doffer, a bobbin magazine having a bottom, and means on the doffer for raising and lowering said bottom.

23. In a doffer, a bobbin magazine having a bottom and a bottom-locking means, and means on the doffer for operating said locking means.

24. In a doffer, a doffer framework, a bobbin magazine detachably connected to said doffer framework and having a vertically removable bottom, and means on said framework for removing said bottom.

25. In a doffer, a doffer framework, a bobbin magazine detachably connected to said doffer framework and having a vertically removable bottom, and means on said framework for removing and replacing said bottom.

26. In a doffer, a removable bobbin magazine having a removable bottom, bobbin-removing means located below the magazine, said removing means being adapted to support the bobbins contained in said magazine, and means for withdrawing the bottom of the magazine to a point below said bobbin-removing means.

27. In a doffer, a bobbin magazine having a removable bottom and a vertically-movable support on the doffer for said bottom.

28. In a doffer, a bobbin magazine having a removable bottom and bottom-locking means, a support on said doffer for said bottom, and means associated with said support for operating said locking means.

29. In a doffer, a bobbin magazine having a removable bottom and bottom-locking means, a vertically-movable support in the doffer for said bottom, and a lever associated with said support and movable vertically therewith, said lever being adapted to operate said locking means.

30. In a doffer, a supporting framework, a bobbin magazine supported in said framework and having a removable bottom and bottom-locking means, a rod vertically-movable in said framework, a support carried by said rod for said bottom, lock-operating means carried by said rod, and means for reciprocating said rod.

31. In a doffer, a supporting framework, a bobbin magazine supported by said framework and having a removable bottom and bottom-locking means, a rod vertically-movable in said framework, a support carried by the upper end of said rod for said bottom, and a lever pivoted on said rod, and adapted to operate said bottom-locking means.

32. In a doffer, a magazine for "filling" bobbins, one side of said magazine having spaces therein for the tips of the bobbins, said spaces being of substantially the same width as the tips, and the opposite side of the magazine having butt-receiving compartments of substantially greater width than the butts of the bobbins.

33. In a doffer, a magazine having a space therein for the tips of a tier of bobbins, said space being of substantially the same width as a bobbin-tip, and a space for the butts of the tier of bobbins, said butt-receiving space being of substantially greater width than a bobbin-butt, and a bobbin-moving means below the magazine having opposite recesses for tips and butts, the tip-receiving space in the magazine being displaced from a position directly opposite the butt-receiving space in the magazine, toward the side from which the bobbin-moving means approaches.

34. In a doffer, a magazine for "filling" bobbins having a space therein of substantially greater width than the butts of the bobbins but of less width than twice the diameter of a bobbin-butt, so that the bobbins may be piled in said space with their butts staggered, said magazine having a space for the tips of all the bobbins contained in the first mentioned space, the width of the second mentioned space being substantially the diameter of a bobbin-tip, whereby the tips of the bobbins may be directly superposed, one upon another, in said tip-receiving space.

35. In a doffer, a magazine for "filling" bobbins having a space therein of substantially greater width than the butts of the bobbins so that the bobbins may be piled in staggered arrangement in said space, said space being narrowed toward its lower end so that as the bobbins descend in said space they approach a position of vertical alinement.

36. In a doffer, a magazine for "filling" bobbins, one side of said magazine having spaces therein for the tips of the bobbins, said spaces being of substantially the same width as the tips, and the opposite side of the magazine having butt-receiving compartments of substantially greater width than the butts of the bobbins, the lower ends of said compartments being narrower than the upper portions thereof.

37. In a doffer, a bobbin magazine having a withdrawable closure for its lower end, a support for the lower end of said magazine, bobbin-moving means below the lower end of said magazine, and means for supporting the closure below the plane of the operative portion of said bobbin-moving means.

38. In a doffer, a bobbin magazine, means for removing bobbins from the magazine, bobbin-donning means, and a swinging device for transferring bobbins from said removing means to said donning means.

39. In a doffer, a bobbin magazine, means for removing bobbins from the magazine, bobbin-donning means, a pivoted tray for transferring bobbins from said removing means to said donning means, and means for swinging said tray.

40. In a doffer, a bobbin magazine, a bobbin conveyer arranged beneath said magazine for removing bobbins therefrom, a donning tube, and a swinging device adapted to receive bobbins discharged by said conveyer and transfer them to said tube.

41. In a doffer, a bobbin magazine, a bobbin conveyer arranged beneath said magazine for removing bobbins therefrom, a donning tube, a pivoted tray adapted to receive bobbins discharged by said conveyer and transfer them to said tube, and means for swinging said tray.

42. In a doffer, a carriage framework, a structure mounted to reciprocate horizontally with relation to said framework, a part mounted to reciprocate vertically with relation to said structure, a bobbin-seater connected to said structure, a spring for moving said bobbin-seater downwardly with relation to said structure, and means for moving said bobbin-seater upwardly.

43. In a doffer, a carriage framework, a structure mounted to reciprocate horizontally with relation to said framework, a part mounted to reciprocate vertically with relation to said structure, a bobbin-seater connected to said structure, a spring for moving said bobbin-seater downwardly with relation to said structure, and means on said vertically-reciprocating part for moving said bobbin-seater upwardly.

44. The combination of a spinning frame having doffer-supporting means thereon, said means comprising a rail; a doffer having supporting means thereon, said last mentioned means comprising rollers adapted to travel upon said rail, one of said supporting means being grooved; and lint-removing means mounted in operative relation to the grooved supporting means.

45. The combination of a spinning frame having a rail thereon; a doffer having grooved supporting rollers adapted to travel upon said rail; and lint-removing rollers mounted on the doffer in operative relation to said grooved rollers.

46. In a doffer, a carriage framework, a structure mounted to reciprocate horizontally with relation to said framework, a part mounted to reciprocate vertically with relation to said structure, a rod carried by said structure for vertical reciprocation, a member on the lower portion of said rod adapted to engage a bobbin, a spring for moving said rod downwardly, and a projection attached to said rod and arranged to be engaged by said vertically-reciprocable part for raising said rod and bobbin-engaging member against the tension of said spring.

47. In a doffer, a carriage framework; means to impart a continuous movement to said framework along a spinning frame; a structure mounted to reciprocate horizontally with relation to said framework; a part mounted to reciprocate vertically with relation to said structure; a doffing element on said part; donning means on said structure; a rod carried by said structure for vertical reciprocation; a member on the lower portion of said rod adapted to engage a bobbin; a spring for moving said rod downwardly; and means whereby the rod is raised in the upward movement of said part.

48. In a doffer, a bobbin magazine, means moving transversely of the bobbins in said magazine for removing them from the magazine, inclines on which the bobbins are deposited by said removing means, means to control the movement of the bobbins down said inclines, and means at the lower end of said inclines for placing the bobbins in upright position.

49. In a doffer, a bobbin magazine, means moving transversely of the bobbins in said magazine for removing them from the magazine, guide means on which the bobbins are deposited by said removing means, a member yieldingly pressed against the bobbins while on said guide means to control their movement on said guide means, and means receiving the bobbins from said guide means to place the bobbins in upright position.

50. In a doffer, a bobbin magazine, means moving transversely of the bobbins in said magazine for removing them from the magazine, inclines on which the bobbins are deposited by said removing means, a member yieldingly pressed against the upper side of the bobbins while on said inclines to control their movement down said inclines, and means at the lower end of said inclines for placing the bobbins in upright position.

51. A bobbin magazine for doffers having means providing a plurality of continuous vertical passageways adapted to receive tiers of bobbins, a removable closure arranged to prevent escape of the bobbins, and a latch movably mounted on said closure and adapted to engage the magazine and lock the closure in place.

52. A bobbin magazine having means providing a continuous passage-way adapted to receive a tier of bobbins, a bottom arranged to prevent the escape of bobbins from the lower end of the magazine, and a latch bar pivoted between its ends on said bottom, the ends of said latch bar being arranged to engage opposite sides of the magazine to lock said bottom in place.

53. A bobbin magazine for doffers having means providing a plurality of continuous passage-ways adapted to receive tiers of bobbins, a removable bottom extending across the lower end of the magazine and arranged to prevent the escape of bobbins, and movable latch means arranged to hold the bottom in place.

54. A magazine arranged to contain bobbins and having an open lower end, a bottom insertible into the magazine through said open end, stops within the magazine to determine the position of the bottom, and latch means for locking the bottom in place.

55. A bobbin magazine having means providing a plurality of continuous vertical passage-ways adapted to receive tiers of bobbins, a bottom insertible into the open lower end of the magazine in a direction longitudinal of said passage-ways, and latch means movably mounted on the bottom and arranged to engage the magazine to lock the bottom in place.

56. In a doffer, a bobbin feeding means, means receiving the bobbin from said feeding means, a guide extending between said feeding means and receiving means, and means engaging the upper side of the bobbin for controlling the movement of such bobbin through said guide.

BURT A. PETERSON.

Witnesses:
JOHN F. ELWOOD,
LOUISE A. CULVER.

---

Copies of this patent may be obtained for five cents each, by addressing the "Commissioner of Patents, Washington, D. C."